United States Patent [19]

Seaborne

[11] Patent Number: 4,861,614
[45] Date of Patent: Aug. 29, 1989

[54] INSTANT TRADITIONAL OATMEAL AND METHOD OF PREPARATION

[75] Inventor: Jonathan Seaborne, Corcoran, Minn.

[73] Assignee: General Mills, Inc., Minneapolis, Minn.

[21] Appl. No.: 157,764

[22] Filed: Feb. 19, 1988

[51] Int. Cl.⁴ .............................................. A23L 1/164
[52] U.S. Cl. ..................................... 426/619; 426/620; 426/621; 426/331
[58] Field of Search .............. 426/618, 619, 620, 621, 426/625, 331

[56] References Cited

U.S. PATENT DOCUMENTS

| | | | |
|---|---|---|---|
| 1,839,928 | 1/1932 | Perky | 426/619 |
| 2,278,465 | 4/1942 | Musher | 426/618 |
| 2,552,290 | 5/1951 | Lilly et al. | 426/450 |
| 2,554,869 | 5/1951 | Musher | 426/481 |
| 2,653,099 | 9/1953 | Carman | 426/621 |
| 2,864,702 | 12/1958 | Murray et al. | 426/455 |
| 2,898,210 | 8/1959 | Dale et al. | 426/457 |
| 2,928,743 | 3/1960 | Rutgers | 426/457 |
| 2,999,018 | 9/1961 | Huffman et al. | 426/620 |
| 3,190,754 | 6/1965 | Mathews | 426/626 |
| 3,490,915 | 1/1970 | Tressler | 426/302 |
| 3,494,764 | 2/1970 | Tressler | 426/620 |
| 3,494,769 | 2/1970 | Tressler . | |
| 3,526,512 | 9/1970 | Collins et al. | 426/473 |
| 3,526,514 | 9/1970 | Gralak et al. | 426/620 |
| 3,620,761 | 11/1971 | Spring, Jr. | 426/144 |
| 3,640,729 | 2/1972 | Ronai et al. | 426/450 |
| 3,664,847 | 5/1972 | Hyldon | 426/620 |
| 3,677,768 | 7/1972 | Mokrzycki et al. | 426/463 |
| 3,704,134 | 11/1972 | Ronai et al. | 426/457 |
| 3,732,109 | 5/1973 | Poat et al. | 426/458 |
| 3,787,584 | 1/1974 | Hyldon | 426/473 |
| 4,183,963 | 1/1980 | Brimelow et al. | 426/331 |
| 4,497,840 | 2/1985 | Gould et al. | 426/560 |
| 4,603,055 | 7/1986 | Karwowsky et al. | 426/457 |

FOREIGN PATENT DOCUMENTS

WO86/00089 1/1905 PCT Int'l Appl. .

OTHER PUBLICATIONS

Research Tech. Bull., Dec. 1982, vol. IV, Issue 12, entitled, "Oat Products in Bakery Foods", National Oats., Inc., Cedar Rapids, IA.

Primary Examiner—Donald E. Czaja
Assistant Examiner—Helen Pratt
Attorney, Agent, or Firm—John A. O'Toole

[57] ABSTRACT

Disclosed are shelf stable food compositions comprising infused, dry, oatmeal flakes useful for the preparation of instant oatmeal. The instant oatmeal is, however, characterized by the oatmeal flake size, appearance, texture and taste of traditional oatmeal. The present oatmeal can be prepared by the consumer by simple addition of hot water and a 30 second steeping. Also disclosed are methods of preparing the improved dry oatmeal. The methods involve infusion of oatmeal flakes or preferably steamed oatmeal groats prior to flaking of between 1% to 35% of the oatmeal flakes of low molecular weight solutes such as sugars and polyhydric alcohols. The infused oatmeal flakes are then dried to water activities ranging from 0.17 to 0.7.

34 Claims, No Drawings

INSTANT TRADITIONAL OATMEAL AND METHOD OF PREPARATION

BACKGROUND OF THE INVENTION

1. Technical Field

The present invention relates to food products and to their method of preparation. More particularly, the present invention relates to instant hot cereals based upon oatmeal and to solutes infusion methods of their preparation.

2. The Prior Art

Hot, cooked oatmeal or "prepared oatmeal" has long been a popular food item especially for breakfast. Traditionally, oat groats are steamed for softening and for enzyme inactivation. The steamed groats are then rolled into flakes, optionally sized, dried and packaged. The consumer cooks the oatmeal flakes with hot water, boiling for up to 12 minutes.

While popular, flaked or traditional oatmeal is time consuming to prepare. "Traditional" style oatmeal as used herein refers to a prepared oatmeal characterized by the texture, appearance, and product integrity of whole oat flakes, i.e., of flakes of relatively large size as compared to either quick oats or instant oats. Since oat groats vary in size, the oatmeal flakes prepared therefrom will also vary in size. "Traditional" oatmeal is especially characterized by whole oat flakes. To reduce preparation time, "quick oats" and "instant oatmeal" have long since been developed. Both these products require reduced hot water steeping times of 1–6 minutes and 30–60 seconds respectively.

The methods by which these rapidly rehydrating products are prepared have long been known. "Quick Oats" have been known for over fifty years while Instant Oats have been also long been known. (See, U.S. Pat. No. 2,864,702, issued Dec. 16, 1958 to Murray et al. for "Instant Oats"). Generally, the flaked oats are cooked or gelatinized, dried and, most importantly reduced in flake particle size and thickness. By virtue of the gelatinizing and particle size reduction, rehydration rates are increased resulting in reduced product preparation times. Since traditional oatmeal is also characterized by a viscous texture which does not develop within these reduced preparation times, various viscosity building additives have been taught for addition to these dry products or modification of the oat starch to build viscosity (see U.S. Pat. No. 2,999,018 issued Sept. 5, 1961 to Huffman et al.).

Unfortunately, while more convenient in terms of reduced preparation times, the hot prepared oatmeal cereals prepared from both quick oats and instant oats suffer from texture deterioration. Individual flakes are not recognized. The texture is gruel-like, notwithstanding the self promotional claims of some references with respect to their possession of the texture of traditional oatmeal.

The limitations of instant oatmeal with respect to texture have long been known. Attempts to overcome consumer's aversion have included the addition of flavors or spices, dried fruits (see U.S. Pat. No. 3,526,514 issued Sept. 1, 1970 to Gralak et al.) and/or cream flavor and conveniences in packaging, i.e., individual portion sizes. While popular, these flavored and/or convenience packaged products have only modestly increased the appeal of instant oatmeal. Unfortunately, major technical improvements of instant oatmeal have stagnated, at least in terms of texture improvement, for nearly thirty years, although modest improvements have been taught. (See U.S. Pat. No. 2,898,210 issued Aug. 4, 1959 to W. G. Dale et al. wherein steam treatment of oat groats is taught.)

Recently, more interest has been kindled in encouraging oatmeal consumption due to the health benefits, especially the hypocholesteremic benefits of oatmeal or oat fractions, e.g., oat bran (see U.S. Pat. No. 4,497,840 issued Feb. 5, 1985 to Gould et al.). Nonetheless, the texture limitations remain and instant oatmeal is considered by those knowledgeable as being a fully developed art.

Surprisingly, the present invention provides an instant traditional oatmeal capable of preparation without cooking, i.e., the mere addition of hot water to oatmeal, and which is further characterized by prepared flakes of the size, shape and thickness as well as texture of traditional oatmeal. More surprisingly, neither added gums, starches nor native oat starch modification is required.

The present instant traditional oatmeal flake product is prepared by simple infusion into oatmeal flakes or groats of low molecular weight solutes such as sugars, salt, sugar alcohols and mixtures thereof. While solutes infusion has long been common for the preparation of dried fruits, vegetables and, prior to modern canning, of fish and meats, apparently in fifty years of quick oatmeal research, infusion has not been taught or suggested for use as a means of preparing instant, traditional oatmeal. The present invention thus provides an elegantly simple method of overcoming a long-standing problem in the art.

SUMMARY OF THE INVENTION

In its product aspect, the present invention provides shelf stable food compositions comprising dry, infused flaked oatmeal capable of rapid rehydration in hot water into a hot oatmeal cereal yet having the appearance and texture similar to traditional oatmeal. The infused oatmeal flakes are characterized by being whole flakes of a large size and thickness and added low molecular weight solutes concentration. The size ranges from 2.5 to 6.0 millimeter diameter. The thickness ranges from 0.020 to 0.040 inches (0.5 to 1.2 mm). The water activity (Aw) ranges from about 0.17 to 0.7. The oatmeal flakes are also essentially characterized by an added solutes concentration ranging from 1% to 35%. Useful solutions include sugars, salt, sugar alcohols and mixtures thereof.

In its method aspect, the present invention resides in infusion methods by which the present shelf stable oatmeal flakes are prepared and to methods by which instant oatmeal is prepared thereby. Steamed oatmeal flakes whether or not previously dried are steeped in an infusion bath for times sufficient for the oatmeal flakes to pick up 1% to 35% by weight (solids basis) of infusion solutes and then dried to water activities ranging from 0.17 to 0.7, and packaged.

DETAILED DESCRIPTION OF THE INVENTION

The present invention provides instant traditional oatmeal flakes which can be prepared into a hot, traditional oatmeal upon simple addition of hot water. The present invention also provides infusion methods by which such instant traditional oatmeal flakes can be prepared. Each of the product essential characteristics and components as well as product preparation steps are described in detail below.

Throughout the specification and claims, percentages are by weight and temperatures in degrees Fahrenheit unless otherwise indicated.

In its simplest aspect, the present invention contemplates infusion of commercially available, traditionally sized, i.e., oat flakes. Traditional oat flakes are a staple of commerce. Traditional oat flakes are characterized by a relatively large size and thickness. Sizes generally range from about 60% to 90% on U.S. Standard Size Sieve No. 7, preferably about 55% to 80%. Thickness ranges from about 0.50 to 1.2 mm. Preferably, the oatmeal flakes, or the majority thereof, are whole flakes, and for best results at least 80% whole flakes.

While minor processing variations exist, (see, for example, U.S. Pat. No. 2,898,210 issued to W. G. Dale et al. and which is incorporated herein by reference) useful oat flakes are generally obtained by first cleaning and grading whole oats and drying to 6% to 8% moisture (11.5% maximum). The dried whole oats are then dehulled. The resulting dehulled oats or "groats" are heated with live (i.e., at atmospheric pressure) steam to soften and to inactivate enzymes and then flaked by passage between large steel rollers which flatten the groat into large flakes. Optionally, the groats can be toasted and/or pearled (to remove the outer layer or pericarp) prior to flaking.

In the present method of preparation the oat flakes are then essentially infused with an infusion solution or bath essentially comprising about 5% to 50% low molecular weight infusion solutes. Better results in terms of texture, flavor and processing conditions are obtained when the sugars and salts are balanced with the polyols and other additives and when the infusion bath comprises 20% to 50% solutes. For best results, an infusion bath of about 30% can be used. Useful low molecular solutes can include generally, polyols, sugars, salts and mixtures thereof.

While the precise infusion means or technique is not critical, it has been found that in the preferred embodiment, infusion can be most practically accomplished by soaking the oat groats or flakes in a specially prepared solution or bath containing a number of essential components prior to any drying. Of course, other infusion techniques, e.g., spraying, can also be used to accomplish the desired infusion step.

A first component of the infusion bath or infusion solute can be a polyhydric alcohol or "polyol." The term "polyhydric alcohol" refers to alcohols with two or more hydroxyl groups. Although it is intended to include the most typical such alcohols, namely, glycerol, sorbitol, mannitol, propylene glycol and mixtures thereof, the term also applies to a variety of sugar alcohols which may be classed by the number of hydroxyl groups in the general formula, HOCH(CHOH)nCHCH, where "n" has values from 2 to 5, like tetritols, penitols, heitols, heptitols, etc., as well as stereoisomers thereof. In general, these polyols are water-soluble, crystalline compounds with small optical rotations in water and have a slightly sweet to a very sweet taste. Due to the practical problems of cost, availability, flavor, regulatory approval, etc., glycerol is the most preferred polyol ingredient. Desirably, the polyhydric alcohol comprises about 5% to 30%, preferably about 7% to 20% of the infusion bath.

A second component of the infusion bath can be a sugar(s). Sugar has the advantage of being much less expensive than glycerol while nonetheless providing desired humectant properties. In addition to common sucrose, the term "sugar" refers to any of a number of useful saccharide materials which are capable of increasing the osmotic pressure of the water in which they are dissolved and thereby giving rise to the requisite water activity controlling effect. Useful sugars include the non-reducing and reducing water-soluble monosaccharides and the reducing and non-reducing polysaccharides and their degradation products; e.g., pentoses, including aldopentoses, methylpentoses, keptopentoses, like xylose and arabinose; a deoxyaldose like rhamnose, hexoses and reducing saccharides such as aldohexoses like glucose, galactose and mannose; the ketohexoses, like fructose and sorbose; disaccharides and maltose; non-reducing disaccharides such as sucrose and other polysaccharides such as dextrin and raffinose; and hydrolyzed starches which contain as their constituents oligosaccharides, especially those based upon corn, i.e., corn syrups or corn syrup solids. The sugar(s) should also be of a low molecular weight so as to offer a substantial effect in increasing the osmotic pressure of the sugar solution.

Highly preferred for use herein are low sweetness sugars such as maltose. Especially useful herein are high maltose corn syrups such as Satin Sweet marketed by Cargill, Inc. which is 81% solids of which 65% is maltose, 3% dextrose and 20% higher saccharides. Most preferred for use herein are maltose corn syrups such as a 63 DE syrup marketed by Cargill, Inc. which is about 84% solids of which 28% is maltose and 40% dextrose.

The sugar component can comprise from about 0% to 50% of the infusion bath, preferably about 0.1% to 40% and, for best results about 35%. In more preferred embodiments, at least 35% of the sugar component is maltose. When greater amounts of sugar(s), especially sweeter sugar(s) are employed, the instant oatmeal compositions may contain small amounts of conventional bittering or anti-sweetening agents, e.g., quinine salts. The precise amounts of such materials employed will depend on a variety of factors including concentration and type of sugar infused, potency of anti-sweetener selected.

The infusion solution can also comprise about 0.1% to 6% common salt, e.g., sodium chloride, or mixtures of sodium chloride and other edible salts, especially potassium chloride, preferably about 1% to 3%.

The duration of the infusion step can be expressed equivalently in two ways. First, and more simply, the infusion step is continued until the infused solutes content of the oatmeal has been increased from a native or pristine value of about 0% to about 10% to 30%, preferably about 4% to 20% (dry basis). In practice, at room temperature, the infusion step can be completed by soaking in a bath about 1 to 12 hours at room temperature (70° F., 21° C.). While not critical, the infused groats or oatmeal typically have water activities of about 0.9 after completion of the infusion step.

The present invention can be practiced at atmospheric pressure. If desired, however, reduced pressures ranging from about 100 to 200 Torr can be employed. Such reduced pressures can be used to accelerate modestly the infusion step.

The present infusion step can be practiced from cold (e.g., 32° F., 0° C.) to hot, (e.g., 185° F., 85° C.) temperatures. Preferably, the bath temperature ranges from about 35° to 75° F., 2° to 25° C. At higher temperatures, the infusion step is accelerated resulting in shorter processing times.

Desirably, when an infusion bath is employed, the infusion bath ratio is high 10:1 and at a minimum is at least 2.5:1, preferably about 6:1 bath to oat pieces, in order to assure complete coverage of the oat groats or flakes by the bath.

The infusion step is practiced until the oatmeal flakes have infused therein, i.e., comprising about 2% to 30%, preferably about 4% to 25% total solutes and for best results about 4% to 20% total infused solutes (dry basis).

Preferred embodiments comprise oatmeal flakes comprising a mixture of infused solutes including 4% to 35% sugar(s), 0.1% to 10% glycerol, 0.1% to 2% salt.

Thereafter, the infused flakes are dewatered or filtered and dried to water activities ranging from about 0.17 to 0.7, preferably about 0.45 to 0.6. The method of drying is not critical. Conventional forced hot air convection drying is the drying method of choice due to both cost and convenience. Higher water activity infused oat flakes can be distributed as a frozen food item.

The resultant traditional, oatmeal flakes can be hydrated by the addition of hot water and steeped for as little as 30 seconds and thus can be referred to as instant. The oatmeal flakes are tolerant to other hydration methods, e.g., boiling or microwave heating. The oatmeal flakes surprisingly also exhibit superior tolerance to extended hydration or cooking times in terms of texture and appearance.

Even more surprisingly, and in other embodiments of the present method, the infusion of steamed oat groats prior to flaking can take place prior to initial dehydration until equivalent amounts of solutes are infused. It is surprising that the small, hard oat groats will absorb the infusion solution. Next, after infusion to concentrations comparable to those described above for flakes the infused whole groats may be flaked and dried to realize the present infused, instant traditional oatmeal flakes. A special advantage of these embodiments is that the infused groats when rolled to produce flakes also exhibit a reduction in lost, broken product and thereby increases the available yield of full sized or desired sized flakes.

The instant oatmeal products can also optionally contain conventional levels of such adjuvant materials as vitamins, preservatives, flavors, and dried fruit materials. If present, each of these materials can comprise about 0.1% to 10%, and for the dried fruit material up to 40%. In one embodiment, one highly preferred adjuvant is a thickener (e.g., about 0.1% to 3%) which will increase viscosity of the prepared oatmeal such as an edible gum. In another embodiment perceived as being more "natural," however, the oatmeal is desirably free of added thickeners. The physical and chemical properties of edible gums and their use are well known in the food art and selection of specific gum and gum suppliers for use herein will pose no problem for the skilled artisan. (See, for example, "Gum Technology in the Food Industry," Glicksman, Academic Press, NY, 1969; "Food Colloids," ed. by H. D. Graham, Avi Publishing Co., Westport CT, 1977; "Industrial Gums," R. L. Whistler, 2nd ed., Academic Press, NY, 1973; "Hydrocolloids (Natural Plant)," Encyclopedia of Food Science, ed. by M. S. Peterson and A. H. Johnson, The Avi Publishing Co., Westport CT, 1978. Conventional thickeners, especially gums are used at conventional concentrations. Useful gum concentrations can range from 0.1% to 3.0%.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure.

EXAMPLE 1

Steamed whole oat groats, Premium A Mill (obtained from National Oats, Cedar Rapids, IA) of traditional size were screened through a U.S. #10 screen to remove fines and rocks. 934 g oat groats were parboiled for five minutes at 200° F. (93° C.) in excess tap water. The groats were then drained and rinsed with cool tap water and refrigerated. The blanched weight was 1518 g (62% water uptake).

The groats were then placed in a brine solution at a ratio of 3000 ml brine to 500 g blanched oats and infused at ambient conditions (65°-70° F.) for four hours with moderate agitation. The brine solution consisted of 30% 64 D.E. corn syrup, 7.5% glycerol, and 3.0% sodium chloride with the balance distilled water. The infused oat groat water activity (Aw) was 0.91. The oats were dried at 110° F. (43° C.) and 40% RH to a final water activity (Aw) of 0.54. The infused groats were then rolled in large flaking rolls to approximately 0.025 inch in thickness. The composition of the groats before and after infusion are listed in Table 1.

TABLE 1

| OAT INFUSION ANALYSIS | | |
|---|---|---|
| | Before Infusion[1] | After Infusion[2] |
| Fructose | 0% | 0% |
| Glucose | 0 | 2.6 |
| Sucrose | <0.5 | <0.5 |
| Maltose | 0 | 1.6 |
| Lactose | 0 | 0 |
| % total sugars | 0 | 4.2 |
| Sorbitol | 0 | 0 |
| Glycerol | 0 | 2.20 |
| Salt | 0 | 1.26 |
| Calcium mg/100 g | 57.10 | 57.10 |
| % moisture | 62.1 | 10.8 |
| Water activity (Aw) | 0.91 | 0.54 |

[1]after 5 minute parboil
[2]after drying at final % $H_2O$, Aw.

An instant infused oatmeal formulation was prepared as follows:
- 25 g infused rolled oat groats
- 12.5 g light brown sugar
- 2.5 g diced dried apples
- 2.5 g diced dried peaches
- 5.0 g raisins
- 0.12 g cinnamon The dried mixture was added to 140 g water and heated for 1.5 minutes in a microwave on high. The resultant hot oatmeal was equivalent in texture and piece identity to the long cook (10–12 minutes) "old-fashioned" oatmeal without the pasty, gummy-like mass associated with the "old-fashioned" oatmeal, current commercially available regular oatmeal or quick oatmeal. A second preparation was prepared using plain sugar in substitution for the brown sugar with similar results.

EXAMPLE 2

Steamed whole oat groats, Premium A Mill (obtained from National Oats, Cedar Rapids, IA) were screened through a U.S. #10 screen to remove fines and rocks. 934 g oat groats were parboiled for five minutes at 200° F. (93° C.) in excess tap water. The groats were then drained and rinsed with cool tap water and refrigerated. The blanched weight was 1518 g (62% water uptake).

The groats were then placed in a brine solution at a ratio of 10 parts volume of brine to 1 part by weight of oats and infused at ambient conditions (65°–70° F.) for four hours with moderate agitation. The brine solution consisted of 30% 64 D.E. corn syrup, 7.5% glycerol, 3.0% sodium chloride with the balance distilled water. The infused oat groat water activity (Aw) was 0.90. The oats were dried at 110° F. (43° C.) and 40% RH to a final water activity (Aw) of 0.50. The infused groats were then rolled in large flaking rolls to approximately 0.025 inch in thickness. The composition of the groats before and after infusion are listed in Table 2.

TABLE 2
OAT INFUSION ANALYSIS

| | Before Infusion[1] | After Infusion[2] |
|---|---|---|
| Fructose | 0% | 0% |
| Glucose | 0 | 4.3% |
| Sucrose | <0.5% | <0.5% |
| Maltose | 0 | 2.7 |
| Lactose | 0 | 0 |
| % total sugars | 0 | 7.0 |
| Sorbitol | 0 | 0 |
| Glycerol | 0 | 4.6 |
| Salt | 0 | 0.02 |
| Calcium mg/100 g | 51 | 51 |
| % moisture | 61.5 | 9.18 |
| Water activity (Aw) | 0.90 | 0.50 |

[1]after 5 minute parboil
[2]after drying at final % H₂O, Aw.

An instant infused oatmeal formulation was prepared as follows:
- 25 g infused rolled oat groats
- 12.5 g light brown sugar
- 2.5 g diced dried apples
- 2.5 g diced dried peaches
- 5.0 g raisins
- 0.12 g cinnamon The dried mixture was added to 140 g water and heated for 1.5 minutes in a microwave on high. The resultant hot oatmeal was equivalent in texture and piece identity to the long cook (10–12 minutes) "old-fashioned" oatmeal without the pasty, gummy-like mass associated with the "old-fashioned" oatmeal, current regular oatmeal or quick oatmeal. The second preparation was also prepared using plain sugar in substitution for the brown sugar with similar results.

EXAMPLE 3

The #5 rolled oats (thickness 0.023 inch, 0.6 mm, water activity Aw 0.31) obtained from National Oats, Cedar Rapids, IA, were placed in a brine solution at a ratio of 3000 ml of brine to 400 g dry rolled oats and infused at ambient conditions (65°–70° F.) for four hours with moderate agitation. The brine solution consisted of 30% 64 D.E. corn syrup, 7.5% glycerol and 3.0% sodium chloride with the balance distilled water. The infused rolled oat water activity (Aw) was 0.879. The oats were dried at 110° F. (43° C.) and 40% RH to a final water activity (Aw) of 0.271. The composition of the rolled oat flakes before and after infusion are listed in Table 3.

25 g of infused oats were added to 120 g of hot water and steeped for 45 seconds. The resultant oatmeal was equivalent in texture and piece identity to the traditional long cook (10–12 minutes) without the pasty, gummy-like mass usually associated with oatmeal. The sweetness of the infused flakes was fine, not too sweet, similar in sweetness to the addition of about 3 g of sugar to regular oatmeal.

TABLE 3
OAT INFUSION ANALYSIS

| | Before Infusion[1] | After Infusion[2] |
|---|---|---|
| Fructose | 0% | 0% |
| Glucose | 0 | 8.3 |
| Sucrose | <0.5 | <0.5 |
| Maltose | 0 | 5.10 |
| Lactose | 0 | 0 |
| % total sugars | 0 | 13.40 |
| Sorbitol | 0 | 0 |
| Glycerol | 0 | 7.3 |
| Salt | 0 | 3.0 |
| Calcium mg/100 g | 57.1 | 57.1 |
| % moisture | 9.8 | 3.64 |
| Water activity (Aw) | 0.31 | 0.271 |

[1]before infusion as received
[2]after drying at final % H₂O, Aw.

EXAMPLE 4

Steamed whole oat groats, Premium A Mill, were screened through a U.S. #10 screen to remove fines and rocks. The groats were then placed into a boiling brine solution at a ratio of 3000 ml brine to 400 g of dry oat groats and infused at 180° F. (82.2° C.) for 10 minutes with moderate agitation. The brine solution consisted of 30% 64 D.E. corn syrup, 7.5% glycerol, 3.0% sodium chloride with the balance distilled water. The infused oat groat water activity (Aw) was 0.896. The infused oat groats were dried at 110° F. (43° C.) and 40% RH (relative humidity) to a final water activity (Aw) of 0.544. The infused groats were then rolled in large flaking rolls to approximately 0.025 inch in thickness. The composition of the groats before and after infusion are listed in Table 4.

TABLE 4
OAT INFUSION ANALYSIS

| | Before Infusion[1] | After Infusion[2] |
|---|---|---|
| Fructose | 0% | 0% |
| Glucose | 0 | 1.50 |
| Sucrose | <0.5 | 0.77 |
| Maltose | 0 | 1.0 |
| Lactose | 0 | 0 |
| % total sugars | 0 | 3.27 |
| Sorbitol | 0 | 0 |
| Glycerol | 0 | 1.8 |
| Salt | 0 | 0.63 |
| Calcium mg/100 g | 55 | 55 |
| % moisture | 9.8 | 10.44 |
| Water activity (Aw) | 0.31 | 0.54 |

[1]as received
[2]after drying at final % H₂O, Aw.

EXAMPLE 5

5 rolled oats (National Oats, Cedar Rapids, IA) were placed into a boiling brine solution at a ratio of 3000 ml brine to 400 g of dry oat flakes and infused at 180° F. (82.2° C.) for 10 minutes with moderate agitation. The brine solution consisted of 30% 64 D.E. corn syrup, 7.5% glycerol, 3.0% sodium chloride with the balance distilled water. The infused rolled oat water activity (Aw) was 0.94. The oats were dried at 110° F. (43° C.) and 40% RH to a final water activity (Aw) of 0.55.

The composition of the groats before and after infusion are listed in Table 5.

TABLE 5

| OAT INFUSION ANALYSIS | | |
|---|---|---|
| | Before Infusion[1] | After Infusion[2] |
| Fructose | 0% | 0% |
| Glucose | 0 | 1.2 |
| Sucrose | <0.5 | 0.63 |
| Maltose | 0 | 0.84 |
| Lactose | 0 | 0 |
| % total sugars | 0 | 2.67 |
| Sorbitol | 0 | 0 |
| Glycerol | 0 | 1.40 |
| Salt | 0 | 0.65 |
| Calcium mg/100 g | 57 | 57 |
| % moisture | 9.8 | 10.23 |
| Water activity (Aw) | 0.31 | 0.55 |

[1] as received
[2] after drying at final % H$_2$O, Aw.

EXAMPLE 6

Steamed whole oat groats of a quality type, referred to as Premium A Mill from National Oats, Cedar Rapids, IA, were screened through a U.S. No. #10 screen to remove fines and rocks. The 934 g oat groat were parboiled for five minutes at 200° F. (93° C.) in excess tap water. The groats were then drained and rinsed with cool tap water and refrigerated. The blanched weight was 1518 g (62% water uptake). The groats were then placed in a brine solution at a ratio of 3000 ml brine to 500 g blanched oats and infused at ambient conditions (65°-70° F.) for four hours with moderate agitation. The brine solution consisted of a 45% sucrose solution with the balance distilled water. The infused oat groat water activity (Aw) was 0.896. The oats were dried at 110° F. (43° C.) and 40% RH to a final water activity (Aw) of 0.544. The infused groats were then rolled in large flaking rolls to approximately 0.025 inch in thickness. The composition of the groats before and after infusion are listed in Table 6.

TABLE 6

| OAT INFUSION ANALYSIS | | |
|---|---|---|
| | Before Infusion[1] | After Infusion[2] |
| Fructose | 0% | 0% |
| Glucose | 0 | 0 |
| Sucrose | <0.5 | 8.9 |
| Maltose | 0 | 0 |
| Lactose | 0 | 0 |
| % total sugars | 0 | 8.9 |
| Sorbitol | 0 | 0 |
| Glycerol | 0 | 0 |
| Salt | 0 | 0 |
| Calcium mg/100 g | 57 | 57 |
| % moisture | 60.1 | 10.14 |
| Water activity (Aw) | 0.896 | 0.544 |

[1] after 5 minute parboil
[2] after drying at final % H$_2$O, Aw.

EXAMPLE 7

Steamed whole oat groats, Premium A Mill, were screened through a U.S. #10 screen to remove fines and rocks. 934 g oat groat were parboiled for five minutes at 200° F. (93° C.) in excess tap water. The groats were then drained and rinsed with cool tap water and refrigerated. The blanched weight was 1518 g (62% water uptake).

The groats were then placed in a brine solution at a ratio of 6 parts brine to 1 part blanched oats and infused at ambient conditions (65°-70° F.) for four hours with moderate agitation. The brine solution consisted of a 7.5% sorbitol solution with the balance distilled water. The infused oat groat water activity (Aw) was 0.906. The oats were dried at 110° C. 43° C.) and 40% RH to a final water activity (Aw) of 0.497. The infused groats were then rolled in large flaking rolls to approximately 0.025 inch in thickness. The composition of the groats before and after infusion are listed in Table 7.

TABLE 7

| OAT INFUSION ANALYSIS | | |
|---|---|---|
| | Before Infusion[1] | After Infusion[2] |
| Fructose | 0% | 0% |
| Glucose | 0 | 0 |
| Sucrose | 0 | 0 |
| Maltose | 0 | 0 |
| Lactose | 0 | 0 |
| % total sugars | 0 | 0 |
| Sorbitol | 0 | 3.2 |
| Glycerol | 0 | 0 |
| Salt | 0 | 0 |
| Calcium mg/100 g | 56 | 56 |
| % moisture | 59.1 | 9.77 |
| Water activity (Aw) | 0.906 | 0.497 |

[1] after 5 minute parboil
[2] after drying at final % H$_2$O, Aw.

EXAMPLE 8

Steamed whole oat groats, Premium A Mill, were screened through a U.S. #10 screen to remove fines and rocks. 934 g oat groats were parboiled for five minutes at 200° F. (93° C.) in excess tap water. The groats were then drained and rinsed with cool tap water and refrigerated. The blanched weight was 1518 (62% water uptake).

The groats were then placed in a brine solution at a ratio of 6 parts by volume brine to 1 part by weight blanched oats and infused at ambient conditions (65°-70° F., 19°-21° C.) for four hours with moderate agitation. The brine solution consisted of a 45% molasses Grade A unsulfured—(Western Commerce Corporation, City of Industry, CA) a cane molasses with the balance distilled water. The infused oat groat water activity (Aw) was 0.915. The oats were dried at 110° F. (43° C.) and 40% RH to a final water activity (Aw) of 0.445. The infused groats were then rolled in large flaking rolls to approximately 0.025 inch in thickness. The composition of the groats before and after infusion are listed in Table 8.

TABLE 8

| OAT INFUSION ANALYSIS | | |
|---|---|---|
| | Before Infusion[1] | After Infusion[2] |
| Fructose | 0% | 1.8% |
| Glucose | 0 | 2.0 |
| Sucrose | 0 | 3.4 |
| Maltose | 0 | 0 |
| Lactose | 0 | 0 |
| % total sugars | 0 | 7.2 |
| Sorbitol | 0 | 0 |
| Glycerol | 0 | 0 |
| Salt | 0 | 0 |
| Calcium mg/100 g | 56 | 56 |

TABLE 8-continued

| OAT INFUSION ANALYSIS | Before Infusion[1] | After Infusion[2] |
|---|---|---|
| % moisture | 61.1 | 9.16 |
| Water activity (Aw) | 0.915 | 0.445 |

[1]after 5 minute parboil
[2]after drying at final % H₂O, Aw.

EXAMPLE 9

Steamed whole oat groats were screened through a U.S. #10 screen to remove fines and rocks. 934 g oat groats parboiled for five minutes at 200° F. (93° C.) in excess tap water. The groats were then drained and rinsed with cool tap water and refrigerated. The blanched weight was 1518 g (62% water uptake).

The groats were then placed in a brine solution at a ratio of 3000 ml brine to 500 g blanched oats and infused at ambient conditions (65°-70° F.) for four hours with moderate agitation. The brine solution consisted of 45% honey—Light Amber Poliflor—Western Commerce Corporation, City of Industry, Calif. with the balance distilled water. The infused oat groat water activity (Aw) was 0.901. The oats were dried at 110° F. (43° C.) and 40% RH to a final water activity (Aw) of 0.444. The infused groats were then rolled in large flaking rolls to approximately 0.025 inch in thickness. The composition of the groats before and after infusion are listed in Table 9.

TABLE 9

| OAT INFUSION ANALYSIS | Before Infusion[1] | After Infusion[2] |
|---|---|---|
| Fructose | 0% | 4.3% |
| Glucose | 0 | 3.7 |
| Sucrose | 0 | 0.6 |
| Maltose | 0 | 0 |
| Lactose | 0 | 0 |
| % total sugars | 0 | 8.6 |
| Sorbitol | 0 | 0 |
| Glycerol | 0 | 0 |
| Salt | 0 | 0 |
| Calcium mg/100 g | 56 | 56 |
| % moisture | 61.3 | 8.72 |
| Water activity (Aw) | 0.901 | 0.444 |

[1]after 5 minute parboil
[2]after drying at final % H₂O, Aw.

EXAMPLE 10

Steamed whole oat groats were screened through a U.S. #10 screen to remove fines and rocks. 934 g oat groats were parboiled for five minutes at 200° F. (93° C.) in excess tap water. The groats were then drained and rinsed with cool tap water and refrigerated. The blanched weight was 1518 g (62% water uptake).

The groats were then placed in a brine solution at a ratio of 3000 ml brine to 500 g blanched oats and infused at ambient conditions (65°-70° F.) for four hours with moderate agitation. The brine solution consisted of 45% molasses Grade A unsulfured, 3.0% calcium lactate, 0.025% calcium chloride with the balance distilled water. The infused oat groat water activity (Aw) was 0.901. The oats were dried at 110° F. (43° C.) and 40% RH to a final water activity (Aw) of 0.500. The infused groats were then rolled in large flaking rolls to approximately 0.025 inch in thickness. The composition of the groats before and after infusion are listed in Table 10.

TABLE 10

| OAT INFUSION ANALYSIS | Before Infusion[1] | After Infusion[2] |
|---|---|---|
| Fructose | 0% | 1.9% |
| Glucose | 0 | 2.2 |
| Sucrose | 0 | 3.4 |
| Maltose | 0 | 0 |
| Lactose | 0 | 0 |
| % total sugars | 0 | 7.5 |
| Sorbitol | 0 | 0 |
| Glycerol | 0 | 0 |
| Salt | 0 | 0 |
| Calcium mg/100 g | 56 | 195 |
| % moisture | 60.4 | 9.5 |
| Water activity (Aw) | 0.901 | 0.500 |

[1]after 5 minute parboil
[2]after drying at final % H₂O, Aw.

An instant infused oatmeal formulation was prepared as follows:
- 25 g infused rolled oat groats
- 2.0 g light brown sugar
- 2.5 g diced dried apples
- 2.5 g diced dried peaches
- 5.0 g raisins
- 0.12 g cinnamon The dried mixture was added to 140 g water and heated for 1.5 minutes in a microwave on high. The resultant hot oatmeal was equivalent in texture and piece identity to the long cook (10-12 minutes) "old-fashioned" oatmeal without the pasty, gummy-like mass associated with the "old-fashioned" oatmeal, current regular oatmeal or quick oatmeal. A second preparation was prepared using plain sugar in substitution for the brown sugar with similar results.

EXAMPLE 11

Steamed whole oat groats were screened through a U.S. #10 screen to remove fines and rocks. 934 g oat groats were parboiled for five minutes at 200° F. (93° C.) in excess tap water. The groats were then drained and rinsed with cool tap water and refrigerated. The blanched weight was 1518 g (62% water uptake).

The groats were then placed in a brine solution at a ratio of 3000 ml brine to 500 g blanched oats and infused at ambient conditions (65°-70° F.) for four hours with moderate agitation. The brine solution consisted of 5% sodium chloride and 0.5% calcium chloride with the balance distilled water. The infused oat groat water activity (Aw) was 0.919. The oats were dried at 110° F. (43° C.) and 40% RH to a final water activity (Aw) of 0.512. The infused groats were then rolled in large flaking rolls to approximately 0.025 inch in thickness. The composition of the groats before and after infusion are listed in Table 11.

TABLE 11

| OAT INFUSION ANALYSIS | Before Infusion[1] | After Infusion[2] |
|---|---|---|
| Fructose | 0% | 0% |
| Glucose | 0 | 0 |
| Sucrose | 0 | <0.5% |
| Maltose | 0 | 0 |
| Lactose | 0 | 0 |
| % total sugars | 0 | <0.5% |
| Sorbitol | 0 | 0 |
| Glycerol | 0 | 0 |
| Salt | 0 | 2.98 |
| Calcium mg/100 g | 56 | 196 |
| % moisture | 61.0 | 10.99 |

TABLE 11-continued

| OAT INFUSION ANALYSIS | | |
|---|---|---|
| | Before Infusion[1] | After Infusion[2] |
| Water activity (Aw) | 0.919 | 0.512 |

[1]after 5 minute parboil
[2]after drying at final % H₂O, Aw.

EXAMPLE 12

Steamed whole oat groats were screened through a U.S. #10 screen to remove fines and rocks. 934 g oat groats were parboiled for five minutes at 200° F. (93° C.) in excess tap water. The groats were then drained and rinsed with cool tap water and refrigerated. The blanched weight was 1518 g (62% water uptake).

The groats were then placed in a brine solution at a ratio of 3000 ml brine to 500 g blanched oats and infused at ambient conditions (65°-70° F.) for four hours with moderate agitation. The brine solution consisted of 15% glycerol and sodium chloride with the balance distilled water. The infused oat groat water activity (Aw) was 0.905. The oats were dried at 110° F. (43° C.) and 40% RH to a final water activity (Aw) of 0.446. The infused groats were then rolled in large flaking rolls to approximately 0.025 inch in thickness. The composition of the groats before and after infusion are listed in Table 12.

TABLE 12

| OAT INFUSION ANALYSIS | | |
|---|---|---|
| | Before Infusion[1] | After Infusion[2] |
| Fructose | 0% | 0% |
| Glucose | 0 | 0 |
| Sucrose | <0.5 | <0.5 |
| Maltose | 0 | 0 |
| Lactose | 0 | 0 |
| % total sugars | 0 | 0 |
| Sorbitol | 0 | 0 |
| Glycerol | 0 | 5.8 |
| Salt | 0 | 1.56 |
| Calcium mg/100 g | 56 | 56 |
| % moisture | 61.5 | 9.11 |
| Water activity (Aw) | 0.905 | 0.446 |

[1]after 5 minute parboil
[2]after drying at final % H₂O, Aw.

EXAMPLE 13

The #5 rolled oats (thickness 0.023 inches, water activity Aw 0.31)—obtained from National Oats, Cedar Rapids, IA — were placed inn a brine solution at a ratio of ml of brine to 400 g dry rolled oats and infused at ambient conditions (65°-70° F.) for four hours with moderate agitation., The brine solution consisted of 45% honey—Light Amber Poliflor,—Western Commerce Corporation with the balance distilled water. The infused rolled oats water activity (Aw) was 0.894. The oats were dried at 110° F. (43° C.) and 40% RH to a final water activity (Aw) of 0.174. The composition of the rolled oat flakes before and after infusion are listed in Table 13.

25 g of infused oats were added to 120 g of hot water and steeped for 45 seconds. The resultant oatmeal was equivalent in texture and piece identity to the traditional long cook (10-12 minutes) without the pasty, gummy-like mass usually associated with oatmeal. The sweetness of the infused flakes was fine, not too sweet, similar in sweetness to the addition of about 8 g or ½ teaspoon of sugar to regular oatmeal.

TABLE 13

| OAT INFUSION ANALYSIS | | |
|---|---|---|
| | Before Infusion[1] | After Infusion[2] |
| Fructose | 0% | 15.8% |
| Glucose | 0 | 13.3 |
| Sucrose | 0 | 1.4 |
| Maltose | 0 | 0 |
| Lactose | 0 | 0 |
| % total sugars | 0 | 30.5 |
| Sorbitol | 0 | 0 |
| Glycerol | 0 | 0 |
| Salt | 0 | 0 |
| Calcium mg/100 g | 56 | 56 |
| % moisture | 60.5 | 2.47 |
| Water activity (Aw) | 0.894 | 0.174 |

[1]after 5 minute parboil
[2]after drying at final % H₂O, Aw.

EXAMPLE 14

The #5 rolled oats (thickness 0.023 inch, water activity Aw 0.31) obtained from National Oats, Cedar Rapids, IA were placed in a brine solution at a ratio of 3000 ml of brine to 400 g dry rolled oats and infused at ambient conditions (65°-70° F.) for four hours with moderate agitation. The brine solution consisted of 45% molasses Grade A unsulfured, from Western Commerce Corporation, a cane molasses, with the balance distilled water. The infused rolled oats water activity (Aw) was 0.915. The oats were dried at 110° F. (43° C.) and 40% RH to a final water activity (Aw) of 0.274. The composition of the rolled oat flakes before and after infusion are listed in Table 14.

25 g of infused oats were added to 120 g of hot water and steeped for 45 seconds. The resultant oatmeal was equivalent in texture and piece identity to the traditional long cook (10-12 minutes) without the pasty, gummy-like mass usually associated with oatmeal. The sweetness of the infused flakes was fine, not too sweet, similar in sweetness to the addition of about ½-1 teaspoon of brown sugar to regular oatmeal with the benefit of a rich molasses flavor.

TABLE 14

| OAT INFUSION ANALYSIS | | |
|---|---|---|
| | Before Infusion[1] | After Infusion[2] |
| Fructose | 0% | 5.2% |
| Glucose | 0 | 5.4 |
| Sucrose | <0.5 | 9.4 |
| Maltose | 0 | 0 |
| Lactose | 0 | 0 |
| % total sugars | 0 | 20.0 |
| Sorbitol | 0 | 0 |
| Glycerol | 0 | 0 |
| Salt | 0 | 0 |
| Calcium mg/100 g | 56 | 56 |
| % moisture | 61.3 | 3.40 |
| Water activity (Aw) | 0.915 | 0.274 |

[1]after 5 minute parboil
[2]after drying at final % H₂O, Aw.

EXAMPLE 15

The #5 rolled oats (thickness 0.023 inch, water activity Aw 0.31)—obtained from National Oats, Cedar Rapids, IA — were placed in a brine solution at a ratio of 3000 ml of brine to 400 g dry rolled oats and infused at ambient conditions (65°-75° F.) for four hours with moderate agitation. The brine solution consisted of 45% molasses Grade A unsulfured, 3% calcium lactate and 0.025% calcium chloride with the balance distilled water. The infused rolled oats water activity (Aw) was 0.905. The oats were dried at 110° F. (43° C.) and 40% RH to a final water activity (Aw) of 0.219. The composition of the rolled oat flakes before and after infusion are listed in Table 15.

TABLE 15

OAT INFUSION ANALYSIS

|  | Before Infusion[1] | After Infusion[2] |
|---|---|---|
| Fructose | 0% | 5.0% |
| Glucose | 0 | 5.3 |
| Sucrose | <0.5 | 9.1 |
| Maltose | 0 | 0 |
| Lactose | 0 | 0 |
| % total sugars | 0 | 19.4 |
| Sorbitol | 0 | 0 |
| Glycerol | 0 | 0 |
| Salt | 0 | 0 |
| Calcium mg/100 g | 56 | N.A. |
| % moisture | 61.0 | 3.51 |
| Water activity (Aw) | 0.905 | 0.219 |

[1] after 5 minute parboil
[2] after drying at final % $H_2O$, Aw.

An instant infused oatmeal formulation was prepared as follows:
25 g infused rolled oat groats
7.0 g light brown sugar
2.5 g diced dried apples
2.5 g diced dried peaches
5.0 g raisins
0.12 g cinnamon The dried mixture was added to 140 g water and heated for 1.5 minutes in a microwave on high. The resultant hot oatmeal was equivalent in texture and piece identity to the long cook (10–12 minutes) "old-fashioned" oatmeal without the pasty, gummy-like mass associated with the "old-fashioned" oatmeal, current regular oatmeal or quick oatmeal. A second preparation was prepared using plain sugar in substitution for the brown sugar with similar results.

EXAMPLE 16

The steamed oat groats are screened through a U.S. #10 screen to remove fines and rocks. 934 g oat groats are parboiled for five minutes at 200° F. (93° C.) in excess tap water. The groats are then drained and rinsed with cool tap water and refrigerated. The blanched weight was 1518 g (62% water uptake).

The groats are then placed in a brine solution at a ratio of 10 parts by volume of brine to 1 part by weight oats and infused at ambient conditions (65°–70° F.) for four hours with moderate agitation. The brine solution consists of 45% brown sugar or soft sugar with the balance distilled water. The infused oat groat water activity (Aw) is 0.90. The oats are dried at 110° F. (43° C.) and 40% RH to a final water activity (Aw) of 0.55. The infused groats are then rolled in large flaking rolls to approximately 0.025 inch in thickness. The composition of the groats after infusion is shown to contain fructose, glucose and sucrose consistent with infusion by a molasses, sugar or unrefined sugar syrup.

EXAMPLE 17

The #5 rolled oats (thickness 0.023 inches, water activity Aw 0.31—obtained from National Oats, Cedar Rapids, IA—are placed in a brine solution at a ratio of 3000 ml brine to 400 g dry rolled oats and infused at ambient conditions (65°–75° F.) for four hours with moderate agitation. The brine solution consists of 5.0% lactose, 20% raffinose and 3% calcium gluconate with the balance distilled water. The infused rolled oats water activity (Aw) is 0.91. The oats are dried at 110° F. (43° C.) and 40% RH to a final water activity (Aw) of 0.51. The composition of the rolled oat flakes after infusion is shown to contain lactose, raffinose and increased calcium as previously demonstrated.

EXAMPLE 18

The steamed oat groats are screened through a U.S. #10 screen to remove fines and rocks. 934 g oat groats are parboiled for five minutes at 200° F. (93° C.) in excess tap water. The groats are then drained and rinsed with cool tap water and refrigerated.

The groats are then placed in a brine solution at a ratio of 6 parts by volume of brine to 1 part by weight oats and infused at ambient conditions (65°–0° F.) for four hours with moderate agitation. The brine solution consists of 10% maltose, 15% glucose, 3% calcium lactate and 0.5% sodium chloride with the balance distilled water. The infused oat groat water activity (Aw) is 0.90. The oats are dried at 110° F. (43° C.) and 40% RH to a final water activity (Aw) of 0.55. The infused groats are then rolled in large flaking rolls to approximately 0.025 inch in thickness. The composition of the groats after infusion is shown to contain maltose, glucose, increased sodium and calcium contents as previously shown in the examples.

EXAMPLE 19

The #5 rolled oats (thickness 0.023 inch, water activity Aw 0.31)—obtained from National Oats, Cedar Rapids, IA — are placed in a brine solution at a ratio of 3000 ml of brine to 400 g dry rolled oats and infused at ambient conditions (65°–75° F.) for four hours with moderate agitation. The brine lution consists of 15% sucrose polyester, 3% calcium gluconate, 0.08% calcium chloride and 0.2% sodium chloride with the balance distilled water. The infused rolled oats water activity (Aw) is 0.89. The oats are dried at 110° F. (43° C.) and 40% RH to a final water activity (Aw) of 0.52. The composition of the rolled oat flakes after infusion is consistent with a sucrose polyol infusion with added calcium and salt contents.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for preparing an instant oatmeal cereal product which upon the addition of hot water or brief microwave heating of added water acquires the texture of traditional whole oat flake cooked oatmeal, comprising the steps of:

A. infusing into oat flakes of whole oat berries with sufficient amounts of a brine comprising about 0.1% to 40% by weight of the brine of sugars and about 5% to 30% by weight of the brine of a polyhydric alcohol at a temperature of about 2° C. to 35° C. for a time sufficient to infuse into the oat flakes about 2% to 35% by weight (dry basis) of the flakes of sugars and about 0.1% to 10% by weight (dry basis) of the flakes of a polyhydric alcohol, said oak flakes having a particle size such that 40% are retained on a U.S. Standard Size 7 screen and having a thickness of about 0.50 to 1.2 mm to form wet infused oat flakes; and B. drying the wet infused oat flakes to a water activity of about 0.17 to 0.7 to form a dried, infused, instant oat flake.

2. The method of claim 1 wherein the infusion step comprises
    soaking the oak flakes in a brine in a weight ratio of brine to flakes of about 4 to 10:1, said brine comprising about 1% to 50% of sugars and polyhydric alcohol.

3. The method of claim 2 wherein at least 80% of the flakes are whole flakes.

4. The method of claim 3 wherein the solutes additionally comprise about 0.1% to 6% by weight (dry basis) of the flakes of sodium chloride.

5. The method of claim 4 wherein the polyhydric alcohol includes glycerol.

6. The method of claim 5 wherein the bath includes about 0.1% to 40% by weight of a high maltose corn syrup having a maltose content of at least 65%.

7. The method of claim 6 where in the infused flakes comprise about 4% to 20% solutes (dry basis).

8. The method of claim 7 wherein the flakes are dried to a water activity of about 0.45 to 0.6.

9. The food product prepared by the method of claim 8.

10. The product of claim 9 additionally comprising about 0.1% to 3% by weight of an edible polysaccharidic gum.

11. The product of claim 10 additionally comprising about 1% to 40% by weight, dry basis, of a dried fruit.

12. The product of claim 11 wherein the flakes have an average thickness of at least 0.9 mm.

13. The product of claim 12 wherein the flakes have an average diameter of at least 4 mm.

14. The food product prepared by the method of claim 7.

15. The food product prepared by the method of claim 6.

16. The food product prepared by the method of claim 5.

17. The food product prepared by the method of claim 4.

18. The food product prepared by the method of claim 3.

19. The food product prepared by the method of claim 2.

20. The food product prepared by the method of claim 1.

21. A method for preparing an instant oatmeal cereal product which upon the addition of hot water or brief microwave heating of added water acquires the texture of cooked oatmeal having a greater concentration of whole oat flakes, comprising the steps of:

A. infusing into whole dehulled, steamed oat groats with sufficient amounts of a brine comprising about 0.1% to 40% by weight of the brine of sugars and about 5% to 30% by weight of the brine of a polyhydric alcohol at a temperature of about 2° C. to 35° C. for a time sufficient to infuse into the oak groats about 2% to 35% by weight (dry basis) of the oat groats of sugars and about 0.1% to 10% by weight (dry basis) of the oat groats of a polyhydric alcohol to form wet infused oat groats;

B. flaking the wet infused oat groats to a thickness ranging from 0.5 to 1.2 mm to form infused oat flakes; and C. drying the wet infused oat flakes to a water activity of about 0.17 to 0.7.

22. The method of claim 21 wherein at least 80% of the flakes are whole flakes.

23. The method of claim 22 wherein the solutes additionally comprise about 0.1 % to 6% by weight (dry basis) of sodium chloride.

24. The method of claim 23 wherein the polyhydric alcohol includes glycerol.

25. The method of claim 24 wherein the bath includes about 0.1% to 40% by weight of a high maltose corn syrup having a maltose content of at least 65%.

26. The method of claim 25 wherein the infused flakes comprise about 4% to 20% solutes (dry basis).

27. The method of claim 26 wherein the flakes are dried to a water activity of about 0.45 to 0.6.

28. The food product prepared by the method of claim 27.

29. The food product prepared by the method of claim 26.

30. The food product prepared by the method of claim 25.

31. The food product prepared by the method of claim 24.

32. The food product prepared by the method of claim 23.

33. The food product prepared by the method of claim 22.

34. The food product prepared by the method of claim 21.

* * * * *

UNITED STATES PATENT AND TRADEMARK OFFICE
CERTIFICATE OF CORRECTION

PATENT NO. : 4,861,614
DATED : Aug. 29, 1989
INVENTOR(S) : Seaborne

It is certified that error appears in the above-identified patent and that said Letters Patent is hereby corrected as shown below:

Col. 9, line 30     "The 934" should be -- 934 --.

Col. 10, line 10    "110°C. 43°C.) should be --110°F. (43°C.) --.

Col. 11, line 14    "groats parboiled" should be -- groats were parboiled --.

Col. 13, line 22    "and sodium" should be -- and 3% sodium --.

Col. 13, line 51    "of ml" should be -- of 3000 ml --.

Col. 14, line 42    "the benefit" should be -- the added benefit --.

Col. 15, line 65    "0.31" should be -- 0.31) --.

Col. 16, line 19    "(65°-0°F.) should be -- (65°-70°F.) --.

Col. 17, line 3     "oak" should be -- oat --.

Col. 17, line 12    "oak" should be -- oat --.

Col. 18, line 15    "oak groats" should be -- oat groats --.

Signed and Sealed this

Second Day of October, 1990

Attest:

HARRY F. MANBECK, JR.

Attesting Officer    Commissioner of Patents and Trademarks